(12) United States Patent  
Everson et al.

(10) Patent No.: US 7,508,816 B1
(45) Date of Patent: Mar. 24, 2009

(54) METHOD AND SYSTEM FOR MAKING A PSTN CALL VIA THE INTERNET

(75) Inventors: John M. Everson, Kansas City, MO (US); Bryce A. Jones, Overland Park, KS (US); Jason R. Delker, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 986 days.

(21) Appl. No.: 10/932,837

(22) Filed: Sep. 1, 2004

(51) Int. Cl.
*H04L 12/66* (2006.01)

(52) U.S. Cl. .................................... 370/352; 370/360

(58) Field of Classification Search .................. 370/352
See application file for complete search history.

(56) References Cited

U.S. PATENT DOCUMENTS

| | | | |
|---|---|---|---|
| 5,838,665 A | 11/1998 | Kahn et al. | |
| 5,907,547 A | 5/1999 | Foladare et al. | |
| 5,974,043 A | 10/1999 | Solomon et al. | |
| 6,069,890 A | 5/2000 | White et al. | |
| 6,097,804 A | 8/2000 | Gilbert et al. | |
| 6,144,670 A | 11/2000 | Sponaugle et al. | |
| 6,192,123 B1 | 2/2001 | Grunsted et al. | |
| 6,226,286 B1 | 5/2001 | Danne et al. | |
| 6,282,284 B1 | 8/2001 | Dezonno et al. | |
| 6,295,292 B1 | 9/2001 | Voit et al. | |
| 6,304,637 B1 | 10/2001 | Mirashrafi et al. | |
| 6,337,858 B1 | 1/2002 | Petty et al. | |
| 6,339,594 B1 | 1/2002 | Civanlar et al. | |
| 6,385,191 B1 | 5/2002 | Coffman et al. | |
| 6,385,193 B1 | 5/2002 | Civanlar et al. | |
| 6,393,016 B2 | 5/2002 | Wegner et al. | |
| 6,411,704 B1 | 6/2002 | Pelletier et al. | |
| 6,430,282 B1 | 8/2002 | Bannister et al. | |
| 6,438,220 B1 | 8/2002 | Liu | |
| 6,445,694 B1 | 9/2002 | Swartz | |

(Continued)

FOREIGN PATENT DOCUMENTS

WO    WO 01/69899 A2    9/2001

OTHER PUBLICATIONS

Nortel Networks, "Succession Multimedia Services: Adding value to the carrier's services portfolio with the Succession Interactive Multimedia Server," Application Brief, 2003.

(Continued)

*Primary Examiner*—Creighton Smith

(57) ABSTRACT

A telephony relay enables a portable communication device that is communicatively coupled to a packet-switched network to originate calls over a circuit-switched telephone network. The telephony relay has a first interface communicatively coupled to the packet-switched network, e.g., via a modem, and a second interface communicatively coupled to the circuit-switched telephone network, e.g., via an analog telephone line. To originate a call to a called number, the portable communication device transmits the called number to the telephony relay, via the packet-switched network. The telephony relay then uses an analog signaling format, e.g., DTMF tones, to transmit the called number to the circuit-switched telephone network. When the call is answered, the telephony relay conveys media between the portable communication device and the circuit-switched telephone network, converting between the analog format used by the circuit-switched network and the packet format used by the packet-switched network.

20 Claims, 3 Drawing Sheets

U.S. PATENT DOCUMENTS

| | | |
|---|---|---|
| 6,480,588 B1 | 11/2002 | Donovan |
| 6,519,251 B1 | 2/2003 | Lim |
| 6,757,276 B1 * | 6/2004 | Harper et al. ............... 370/356 |
| 7,020,128 B1 * | 3/2006 | Gladden et al. ............ 370/352 |
| 2001/0005415 A1 | 6/2001 | Grunsted et al. |
| 2001/0040885 A1 | 11/2001 | Jonas et al. |
| 2002/0064147 A1 | 5/2002 | Jonas et al. |
| 2002/0150081 A1 * | 10/2002 | Fang ......................... 370/352 |
| 2002/0176403 A1 | 11/2002 | Radian et al. |
| 2003/0193933 A1 | 10/2003 | Jonas et al. |
| 2004/0248593 A1 * | 12/2004 | Hicks et al. ................. 455/462 |
| 2006/0098619 A1 * | 5/2006 | Nix et al. .................... 370/352 |

OTHER PUBLICATIONS

Johnston, et al., "SIP Call Flow Examples," draft-ietf-sip-call-flows-03.txt, Mar. 2001.

Johnston, et al., "Session Initiation Protocol PSTN Call Flows," draft-ietf-sipping-call-flows-02.txt, Apr. 2003.

\* cited by examiner

METHOD AND SYSTEM FOR MAKING A PSTN CALL VIA THE INTERNET

BACKGROUND

1. Field of Invention

The present invention relates to telecommunication networks, and more particularly, to methods and systems for making a circuit-switched telephone call via a packet-switched network.

2. Description of Related Art

Voice-over-packet (VoP) based telephone service is becoming increasing popular for a number of reasons. For example, VoP based telephone service may reduce or eliminate the charges that may be incurred if the PSTN is used to make calls, particularly for long-distance calls. In one common approach for accessing VoP based telephone service, a user connects an existing analog telephone to an adapter, e.g., a media terminal adapter such as the Cisco ATA-186 analog telephone adapter, that is connected to the Internet via a broadband modem, such as a DSL modem or cable modem.

In many cases, the adapter may stay in a single location, such as the user's residence. However, the user may also be able to use the adapter to access the Internet from other locations and thereby obtain VoP telephone service when away from the user's residence. Thus, the user may be able to receive the same or similar VoP telephone service, with the same or similar benefits, while the user is traveling. Unfortunately, however, the user may be required to carry the adapter while traveling in order to receive VoP telephone service.

Accordingly, there continues to be an interest in extending the availability of VoP telephone server, e.g., to provide easier access to VoP telephone service to users who are traveling.

SUMMARY

In a first principal aspect, an exemplary embodiment of the present invention provides customer premises equipment for interfacing between a circuit-switched telephone network and a packet-switched network. The customer premises equipment comprises a modem and a telephony relay. The modem is communicatively coupled to the packet-switched network. The telephony relay includes a first interface and a second interface. The first interface is communicatively coupled to the packet-switched network via the modem for exchanging media in a first media format with the packet-switched network. The second interface is communicatively coupled to analog telephone line of the circuit-switched telephone network for exchanging media in a second media format with the circuit-switched telephone network. The telephony relay converts between the first and second media formats.

In a second principal aspect, an exemplary embodiment of the present invention provides a method of originating a call over a circuit-switched telephone network from a portable communication device communicatively coupled to a packet-switched network. The method uses a telephony relay communicatively coupled to the packet-switched network and to an analog telephone line of the circuit-switched telephone network. In accordance with the method, the telephony relay receives a called telephone number from the portable communication device via the packet-switched network. The telephony relay then transmits the called telephone number to the circuit-switched network, via the analog telephone line, in an analog signaling format.

DETAILED DESCRIPTION OF EXEMPLARY EMBODIMENTS

Figure 1:
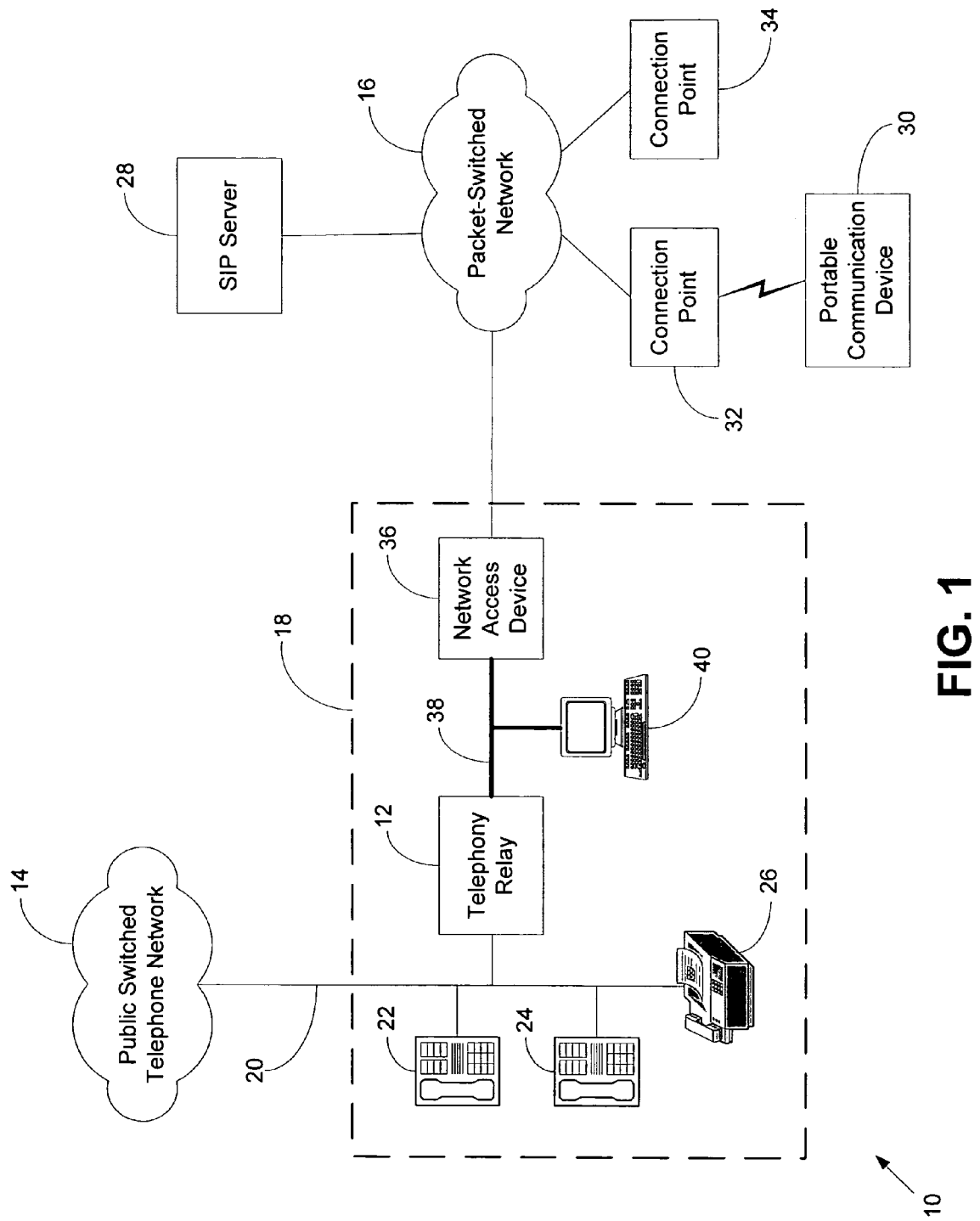
FIG. 1 is a block diagram of a telecommunications system, in accordance with an exemplary embodiment of the present invention.

The present invention, in exemplary embodiments, provides a system and method for enabling a portable communication device that is communicatively coupled to a packet-switched network to originate calls over a circuit-switched telephone network. In an exemplary embodiment, the circuit-switched telephone network may be the public switched telephone network (PSTN), and the packet-switched network may be a wide area network (WAN), such as the Internet. The portable communication device could be, for example, a Wi-Fi® wireless handset, a multi-mode mobile station, an audio-equipped laptop computer, an audio-equipped personal digital assistant (PDA), a VoP phone, an analog telephone connected to a media terminal adapter, or any other portable device able to exchange voice or other media in a packetized format.

The system includes a telephony relay that interfaces between the packet-switched network and the circuit-switched telephone network. More particularly, the telephony relay has a first interface that is communicatively coupled to the packet-switched network, e.g., via a modem, and a second interface that is communicatively coupled to the circuit-switched telephone network, e.g., via an analog telephone line. The telephony relay may be provided as customer premises equipment (CPE), e.g., located at a user's residence or place of business. Thus, the telephony relay may be connected to an analog telephone line that extends to the customer premises and to which other telephony devices, such as analog telephones and fax machines, may be connected.

The portable communication device may access the telephony relay, via the packet-switched network, from remote locations, e.g., when the user is traveling. The portable communication device may be communicatively coupled to the packet-switched network, for example, via a modem, via a local area network (LAN), or via a Wi-Fi® or other wireless link. To originate a call to a called telephone number, the portable communication device may transmit a request that includes the called telephone number, e.g., using the Session Initiation Protocol (SIP), to the telephony relay, via the packet-switched network. When the telephony relay receives the called telephone number via the packet-switched network, the telephony relay transmits the called telephone number to the circuit-switched telephone network, using an analog signaling format, e.g., using dual tone multi-frequency (DTMF) tones. When the call is answered, the telephony relay receives an answer signal, in an analog signaling format, from the circuit-switched network. In response to the answer signal, the telephony relay may engage in additional signaling with the portable communication device to establish a VoP communication session through the packet-switched network.

In this way, the telephony relay may originate a call over the circuit-switched telephone network on behalf of the portable communication device and may establish a communication session with the portable communication device to enable the portable communication device to participate in the call. During the call, the telephony relay conveys media between the circuit-switched telephone network and the packet-switched network, converting between the analog format used by the circuit-switched telephone network and the packet format used by the packet-switched network. In a similar manner, the telephony relay may receive a call from the circuit-switched network and responsively establish a communication session through the packet-switched network to extend the call to the portable communication device.

Thus, the telephony relay may communicate with the portable communication device, so that the portable communication device may function, in many respects, as an extension on the user's existing analog telephone line.

1. EXEMPLARY NETWORK ARCHITECTURE

In accordance with an exemplary embodiment, FIG. 1 shows a telecommunications system 10 that includes a telephony relay 12 interfacing between a circuit-switched telephone network 14 (e.g., the PSTN) and a packet-switched network 16. Telephony relay 12, and the other elements shown in FIG. 1 within the dashed box, may be located at a customer's premises 18. Customer premises 18 could be either a business or residential location.

PSTN 14 may include a plurality of switches interconnected by a plurality of trunks that convey voice or other media in a digital format, such as a pulse code modulation (PCM) format. The switches in PSTN 14 may communicate with each other, e.g., to route calls, using an out-of-band signaling system, such as SS7. However, PSTN 14 may be connected to individual customer premises by analog telephone lines that carry voice or other media in an analog format and that carry in-band signaling in an analog signaling format, e.g., using DTMF tones. Thus, PSTN 14 may be connected to telephony relay 12 via an analog telephone line 20, as shown in FIG. 1. Analog telephone line 20 could be, for example, a two-wire or four-wire circuit provided as twisted pair cable. Analog telephone line 20 may be associated with a particular telephone number, e.g., the telephone number of customer premises 18. Thus, PSTN 14 may route calls made to this telephone number to analog telephone line 20. Similarly, when PSTN 14 routes a call originating from analog telephone line 20, PSTN 14 may include the telephone number of customer premises 18 as the calling party number in the SS7 or other signaling that used to route the call through PSTN 14. In this way, the called party may use a caller identification service to recognize that the call originated from the telephone number of customer premises 18.

Other telephony devices in customer premises 18 may also be connected to analog telephone line 20 and, thus, associated with the telephone number of customer premises 18. For example, analog telephones, such as telephones 22 and 24, and facsimile machines, such as fax machine 26, may be connected to analog telephone line 20. In this way, the devices connected to analog telephone line 20, e.g., telephony relay 12, analog telephones 22 and 24, and fax machine 26, may all receive alert signals that PSTN 14 sends over analog telephone line 20 for incoming calls. In addition, telephony relay 12, analog telephones 22 and 24, and fax machine 26, may all participate in calls carried by analog telephone line 20, i.e., calls either originated or received over analog telephone 18.

Packet-switched network 16 may include one or more local area networks (LANs) and/or one or more wide area network (WANs), such as the Internet. Packet-switched network 16 may route packets using a network protocol, such as the Internet Protocol (IP), in combination with the User Datagram Protocol (UDP) or Transmission Control Protocol (TCP). The IP packets may be carried over lower level protocols, such as asynchronous transfer mode (ATM) protocols. Protocols, such as the Real-Time Transport Protocol (RTP), may be used to carry voice or other media through packet-switched network 16 in a real-time format. Relevant aspects of RTP are described in Schulzrinne, et al., "RTP: A Transport Protocol for Real-Time Applications," Request for Comments 1889 (January 1996), which is incorporated herein by reference.

Other protocols, such as the Session Initiation Protocol (SIP) or the Session Initiation Protocol for Telephones (SIP-T), may be used to set up and/or manage communication sessions through packet-switched network 16. Relevant aspects of SIP are described in Rosenberg, et al., "SIP: Session Initiation Protocol," Request for Comments 3261 (June 2002), which is incorporated herein by reference. Relevant aspects of SIP-T are described in Vemuri, et al., "Session Initiation Protocol for Telephones (SIP-T): Context and Architectures," Request for Comments 3372 (September 2002), which is incorporated herein by reference. SIP and/or other protocols may, in turn, use the Session Description Protocol (SDP) to describe the communication sessions that are being set up or managed. Relevant aspects of SDP are described in M. Handley, et al., "SDP: Session Description Protocol," Request for Comments 2327 (April 1998), which is incorporated herein by reference.

In the exemplary embodiment described herein, SIP is used for communication sessions through packet-switched network 16. However, it is to be understood that other protocols could be used. To support the use of SIP, packet-switched network 16 may be communicatively coupled to one or more SIP servers, such as registrars and proxy servers. These one or more SIP servers are exemplified by SIP server 28 in FIG. 1.

Portable communication devices, such as portable communication device 30, may access packet-switched network 16 from a plurality of different physical locations, using connection points such as connection points 32 and 34. Connection points 32 and 34 may include wireline means, such as RJ-45 connectors, wireless means, such as 802.11x or 802.16 wireless access points, or other means to communicatively couple to portable devices, such as portable communication device 30. Connection points 32 and 34 may also include systems, such as LANs, routers, or modems, for communicating with packet-switched network 16. In this way, portable communication device 30 may use connection point 32 to communicatively couple to packet-switched network 16 while in one location and may use connection point 34 to communicatively couple to packet-switched network 16 while in another location.

Telephony relay 12 may be communicatively coupled to packet-switched network 16 via a network access device 36. Network access device 36 may be, for example, a broadband modem, such as a cable modem or DSL modem. Telephony relay 12 may be connected to network access device 36 via a LAN 38. Other devices may also be connected to LAN 38. For example, a computer 40 is shown connected to LAN 38 in FIG. 1.

2. EXEMPLARY TELEPHONY RELAY

Figure 2:
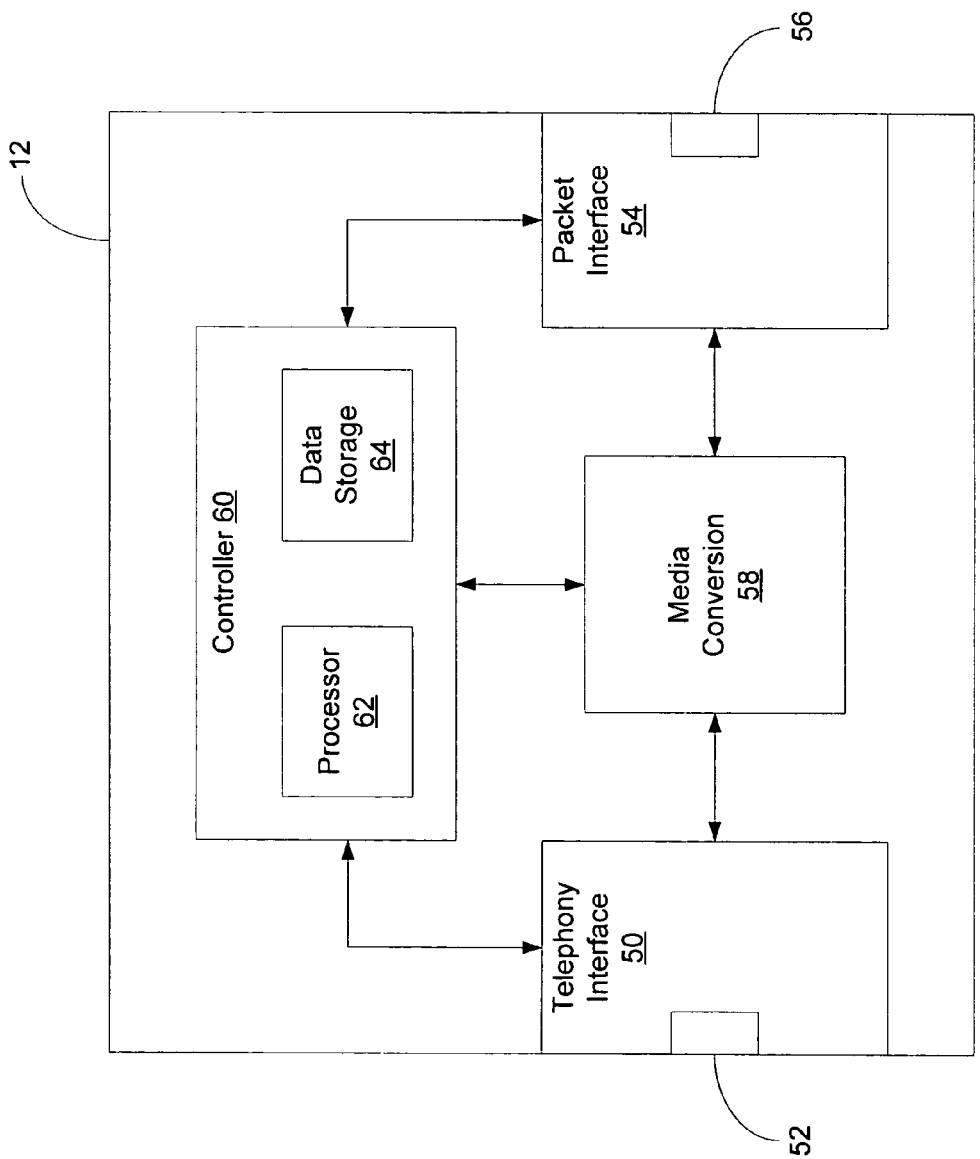
FIG. 2 is a block diagram of a telephony relay, in accordance with an exemplary embodiment of the present invention.

FIG. 2 is a block diagram of telephony relay 12, in accordance with an exemplary embodiment. Telephony relay 12 includes a telephony interface 50 for interfacing with an analog telephone line, such as telephone line 20. Telephony interface 50 may include circuitry for transmitting and receiving analog media, such as voice, and analog signaling, over analog telephone line 20. In particular, telephony interface 50 may include circuitry for generating analog signals, such as DTMF tones, and for detecting analog supervisory signals, such as ringback signals, answer signals, and alert signals. Telephony interface 50 may also include one or more connectors, such as connector 52, for connecting to one or more analog telephone lines. Connector 52 could be an RJ-11 jack, for example.

Telephony relay 12 also includes a packet interface 54 for interfacing with packet-based systems, such as LAN 38. Packet interface 54 could be provided as an Ethernet network interface card and may include a connector 56, such as an RJ-45 jack.

Telephony relay 12 may include a media conversion block 58 coupled to telephony interface 50 and packet interface 54. Media conversion block 58 converts between the analog media that telephony interface 50 transmits and receives over telephone line 20 and the packet-based media that packet interface 54 transmits and receives over LAN 38. Media conversion block 58 may be implemented using hardware, software, and/or firmware.

The operation of telephony relay 12 may be controlled by a controller 60, which may be coupled to telephony interface 50, packet interface 54, and media conversion block 58. Controller 60 may include a processor 62 and data storage 64. Data storage 64 may include volatile memory, such as random access memory (RAM), and/or non-volatile memory, such as read only memory (ROM) or flash memory. Data storage 64 may store various types of data, as well as machine language instructions (i.e., software) that are executed by processor 62 to control the operation of telephony relay 12. For example, data storage 64 may store software for converting between the analog signaling (e.g., DTMF tones and analog supervisor signals) that telephony interface 50 transmits and receives and the packet-based signaling (e.g., SIP signaling) that packet interface 54 transmits and receives. Data storage 64 may also store software for media conversion, e.g., for controlling media conversion block 58.

3. EXEMPLARY COMMUNICATION BETWEEN TELEPHONY RELAY AND PORTABLE DEVICE

Figure 3:
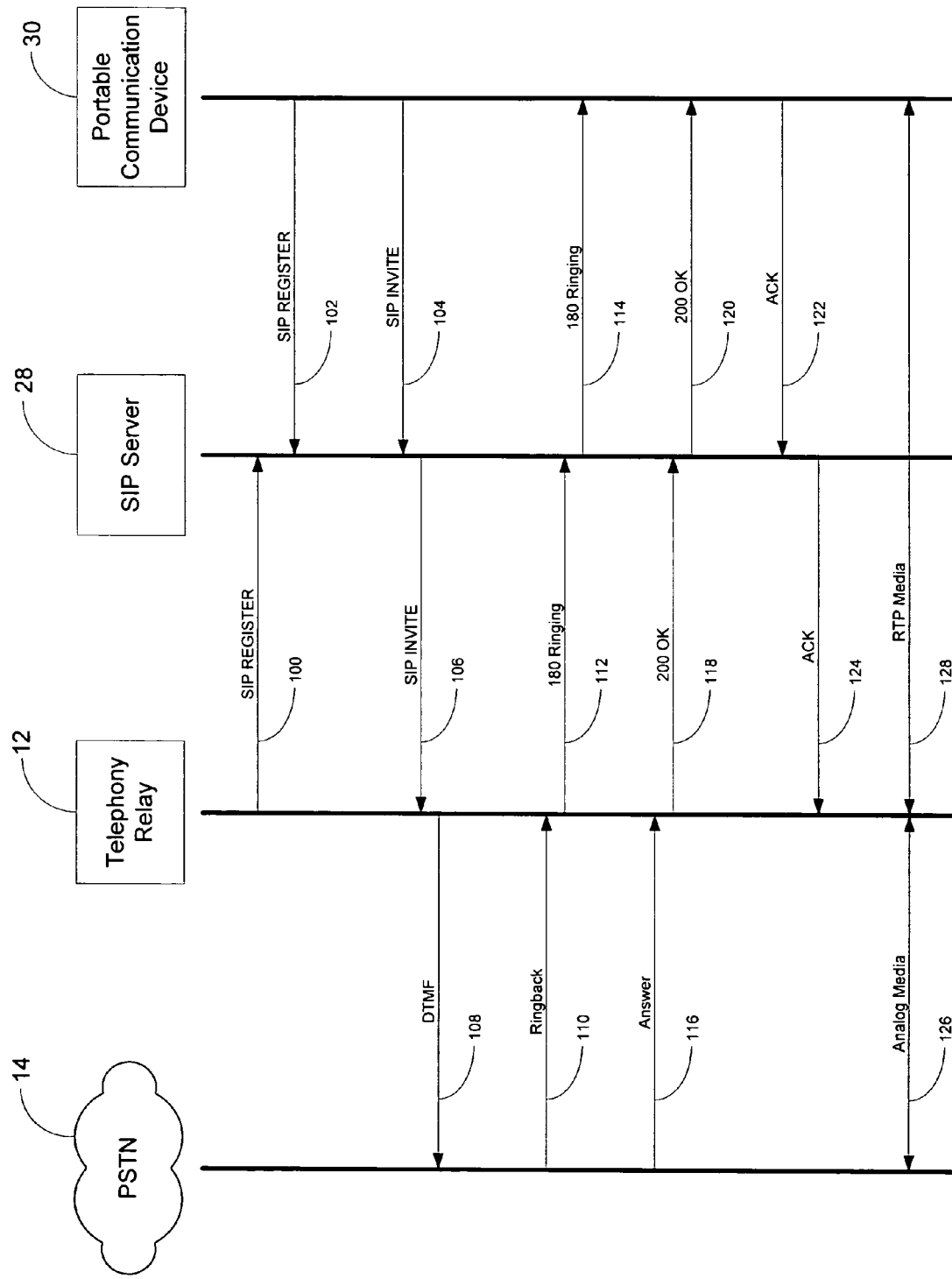
FIG. 3 is a call flow diagram showing how a portable communication device may communicate with a telephony relay to originate a circuit-switched telephone call, in accordance with an exemplary embodiment of the present invention.

In an exemplary embodiment, portable communication device 30, when coupled to packet-switched network 16, e.g., via connection point 32 or 34, is able to communicate with telephony relay 12 to send and/or receive calls that are carried over PSTN 14 and telephone line 20. FIG. 3 illustrates an exemplary call flow for the case of portable communication device 30 using telephony relay 12 to originate a call over PSTN 14. In the call flow of FIG. 3, SIP signaling is used to set up the communication session between portable communication device 30 and telephony relay 12. However, it is to be understood that other signaling protocols could be used instead of or in addition to SIP.

Before portable communication device 30 and telephony relay 12 communicate to originate or receive PSTN calls, both devices may register with a SIP registrar, such as SIP server 28. Thus, telephony relay 12 may send a SIP REGISTER message to SIP server 28 to register a SIP address associated with telephony relay 12, as indicated by step 100. The SIP address that telephony relay 12 registers could be based, for example, on the telephone number associated with telephone line 20.

Once portable communication device 30 is communicatively coupled to packet-switched network, portable communication device 30 may also send a SIP REGISTER message to SIP server 28 to register a SIP address associated with portable communication device 30, as indicated by step 102. The SIP address that portable device 30 registers could also be based on the telephone number associated with telephone line 20, i.e., to signify that portable device 30 may function as an extension on telephone line 20. In this exemplary embodiment, telephony relay 12 and portable communication device 30 are each configured with the other's SIP credentials so as to be able to signal to the other, e.g., via SIP server 28.

To begin the process of using portable communication device 30 to originate a call to a telephone number over PSTN 14, a user may indicate the called telephone number to portable communication device 30. For example, a user may interact with a user interface of portable communication device 30 to input the called telephone number. In response, portable communication device 30 may send a SIP INVITE message to a SIP proxy server, such as SIP server 28, as indicated by step 104. The SIP INVITE message of step 104 may include the SIP address of telephony relay 12 in the Request-URI and may also include the called telephone number. The SIP INVITE message of step 104 may also include appropriate credentials, such as a user name and password, to indicate to telephony relay 12 that the request comes from an authorized user. SIP server 28 may then forward this SIP INVITE message to telephony relay 12, as indicated by step 106.

When telephony relay 12 receives the SIP INVITE message of step 106, telephony relay 12 may check the user name, password, or other credentials included in the message. If these credentials are valid, then telephony relay 12 may transmit the called telephone number to PSTN 14, via telephone line 20, in an analog signaling format, e.g., using DTMF tones, as indicated by step 108. PSTN 14 may then route the call to the called telephone number, e.g., in the same or similar manner as if analog telephone 22 or 24 had originated the call. PSTN 14 may also transmit an analog ringback signal over telephone line 20 to indicate that the called telephone number is being rung, as indicated by step 110.

During the time in which PSTN 14 is trying to connect the call to the called telephone number, telephony relay 12 may transmit one or more signaling messages to portable communication device 30 to indicate the progress of the call. For example, in response to the ringback signal of step 110, telephony relay may transmit a SIP 180 Ringing message to portable communication device, via SIP server 28, as indicated by steps 112 and 114. In response to the 180 Ringing message of step 114, portable communication device 30 may provide a user-discernible indication that the called telephone number is being rung. The user-discernible indication could be audible, such as a ringing sound, visible, such as a graphical or textual indication on a display screen, or could be provided in some other manner.

When the call to the called telephone number is answered, PSTN 14 may transmit an analog answer signal over telephone line 20, as indicated by step 116. In response to the answer signal of step 116, telephony relay 12 may transmit a SIP 200 OK message to portable communication device 30, via SIP server 28, as indicated by steps 118 and 120. When portable communication device 30 receives the 200 OK message, it may provide a user-discernible indication that the call has been answered. The user-discernible indication could be audible, such as the cessation of a ringing sound, visible, such as a graphical or textual indication on a display screen, or could be provided in some other manner. Portable communication device 30 may also transmit an acknowledgement, e.g., a SIP ACK message, to telephony relay 12, via SIP server 28, as indicated by steps 122 and 124.

The receipt of the ACK message of step 124 by telephony relay 12 may complete the process of establishing a communication path between portable communication device 30 and the called station. Thus, portable communication device 30 and the called station may exchange voice or other media via packet-switched network 16, telephony relay 12, and PSTN 14. More particularly, PSTN 14 and telephony relay 12 may exchange voice or other media in an analog format, as indicated by step 126, and telephony relay 12 and portable communication device may exchange voice or other media in a real-time packet format, e.g., using RTP, as indicated by step 128. Telephony relay 12 converts the voice or other media exchanged in the call between these analog and real-time packet formats.

Thus, a user may use portable communication device 30 to access telephony relay 12 from locations remote from customer premises 18, e.g., while the user is traveling, and thereby originate circuit-switched telephone calls from customer premises 18. In this way, the user can make local calls, i.e., calls within the local calling area of customer premises 18, even though the user is located far away from this local calling area. In some cases, the user may be able to access different telephony relays located in different areas using this approach. Thus, the user may be able to originate calls in several different local calling areas using portable communication device 30.

Although FIG. 3 illustrates a call flow for the case where portable communication device 30 uses telephony relay 12 to originate a call, it is to be understood that portable communication device 30 may also be able to receive calls. For example, when a call is placed to the telephone number of customer premises 18, PSTN 14 may transmit an analog alert signal over telephone line 20. The alert signal may cause telephones 22 and 24 to ring in a conventional manner. However, telephony relay 12 may detect the alert signal, e.g., using circuitry in telephony interface 50, and responsively signal portable communication device 30. For example, telephony relay 12 may transmit a SIP INVITE message to portable communication device, via SIP server 28. In response, portable communication device 30 may provide a user-discernible indication of the incoming call. If the user of portable communication device 30 answers the call, then portable communication device 30 and telephony relay 12 may exchange further signaling to establish a communication session, e.g., using RTP, through packet-switched network 16. In addition, telephony relay 12 may go off-hook so as to be able exchange voice or other media with the caller, via telephone line 20. In this way, telephony relay 12 may extend calls that telephony relay 12 receives from PSTN 14 to portable communication device 30.

4. CONCLUSION

Exemplary embodiments of the present invention have been described above. Those skilled in the art will understand, however, that changes and modifications may be made to these embodiments without departing from the true scope and spirit of the invention, which is identified by the claims.

What claimed is:

1. Customer premises equipment (CPE) for interfacing between a circuit-switched telephone network and a packet-switched network at a customer premise of a customer, said CPE comprising:
   a modem communicatively coupled to said packet-switched network; and
   a telephony relay, said telephony relay including a first interface, a second interface, and a controller, said first interface being communicatively coupled to said packet-switched network via said modem for exchanging media in a first media format with said packet-switched network, said second interface being communicatively coupled to an analog telephone line of said circuit-switched telephone network at said customer premise for exchanging media in a second media format with said circuit-switched telephone network, wherein said telephony relay converts between said first and second media formats, and wherein said controller is adapted to perform call signaling with said circuit-switched telephone network and said packet-switched network so that said customer conducts a call over said analog telephone line from a connection to said packet-switched network away from said customer premise.

2. The CPE of claim 1, wherein said modem is a broadband modem.

3. The CPE of claim 1, wherein said modem is a cable modem.

4. The CPE of claim 1, wherein said modem is a digital subscriber line (DSL) modem.

5. The CPE of claim 1, further comprising:
   an analog telephone connected to said analog telephone line.

6. The CPE of claim 5, wherein said second media format is an analog format.

7. The CPE of claim 1, wherein said first media format is a real-time packet format.

8. The CPE of claim 1, wherein said packet-switched network is a wide area network (WAN).

9. The CPE of claim 1, wherein said first interface is communicatively coupled to said modem via a local area network (LAN).

10. A method of originating a call over a circuit-switched telephone network from a portable communication device communicatively coupled to a packet-switched network, using a telephony relay at a customer premise of a customer communicatively coupled to said packet-switched network and to an analog telephone line of said circuit-switched telephone network, said method comprising:
    said telephony relay receiving a called telephone number from said portable communication device, via said packet-switched network;
    said telephony relay receiving and checking credentials from said packet-switched network to validate that said called telephone number was provided by said customer for said customer premise;
    said telephony relay transmitting said called telephone number to said circuit-switched telephone network, via said analog telephone line, in an analog signaling format to establish a call between said customer and said called telephone number using said analog telephone line.

11. The method of claim 10 further comprising:
    said telephony relay receiving an answer signal in said analog signaling format from said circuit-switched telephone network, via said analog telephone line.

12. The method of claim 11, further comprising:

said telephony relay receiving a request from said portable communication device to establish a communication session through said packet-switched network, wherein said request includes said called telephone number.

13. The method of claim 12, further comprising:

in response to said answer signal, said telephony relay transmitting a response to said portable communication device, via said packet-switched network, wherein said response accepts said request.

14. The method of claim 13, further comprising:

said telephony relay conveying media between said portable communication device and said circuit-switched telephone network, wherein said telephony relay exchanges said media in a first media format with said portable communication device and exchanges said media in a second media format with said circuit-switched telephone network.

15. The method of claim 14, further comprising:

said telephony relay converting between said first and second media formats.

16. The method of claim 14, wherein said first media format is a real-time packet format.

17. The method of claim 14, wherein said second media format is an analog media format.

18. The method of claim 10, wherein said packet-switched network is a wide area network (WAN).

19. The method of claim 10, wherein said telephony relay is communicatively coupled to said packet-switched network via a modem.

20. The method of claim 10, wherein said analog signaling format includes dual tone multi-frequency (DTMF) tones.

\* \* \* \* \*